Figure 1:
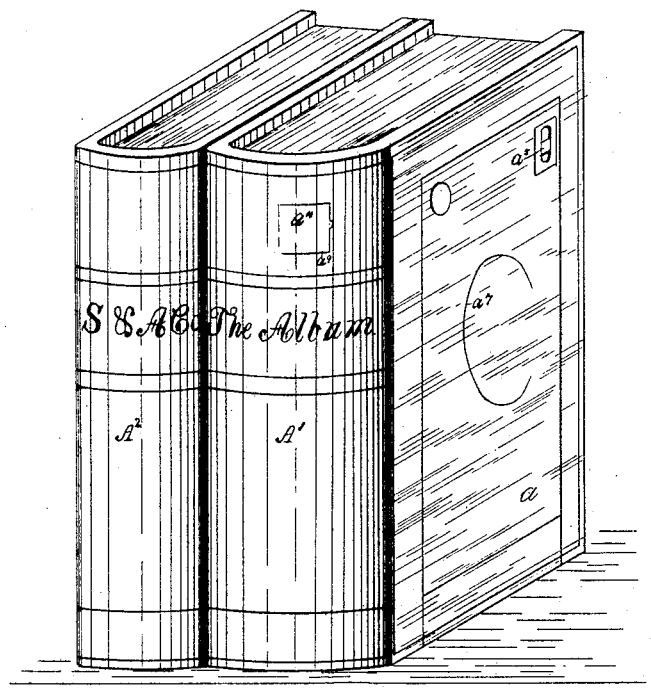

(No Model.) 2 Sheets—Sheet 1.

A. B. DOBBS.
CAMERA.

No. 470,783. Patented Mar. 15, 1892.

WITNESSES:

INVENTOR

BY HIS ATTY (No Model.) 2 Sheets—Sheet 2.
A. B. DOBBS.
CAMERA.
No. 470,783. Patented Mar. 15, 1892.
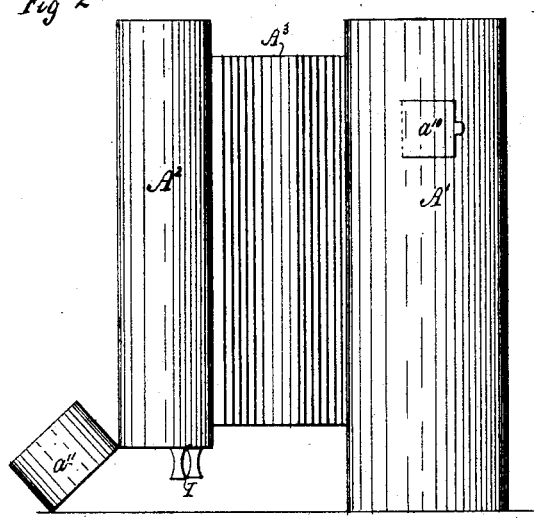
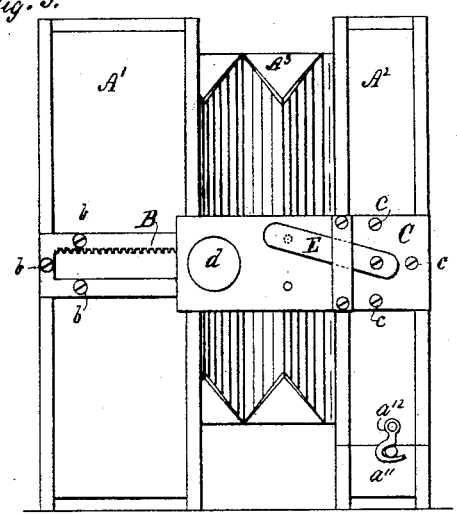
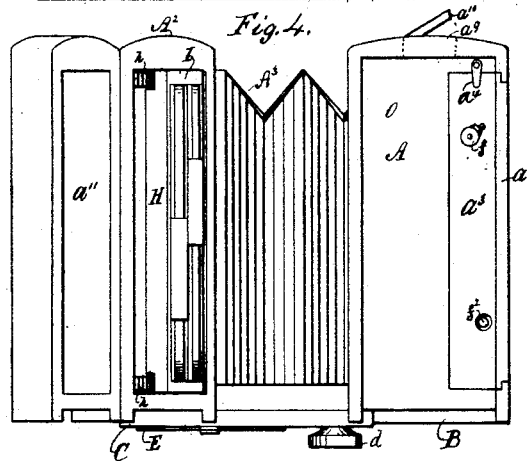
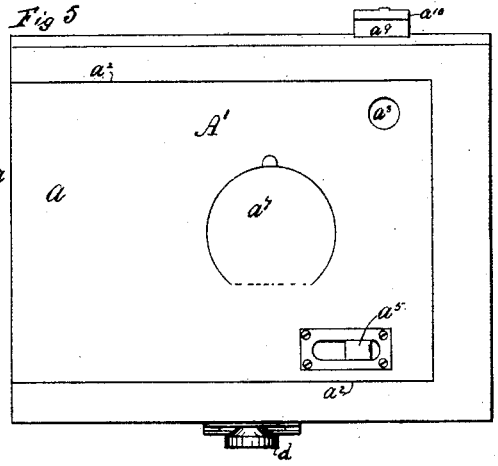
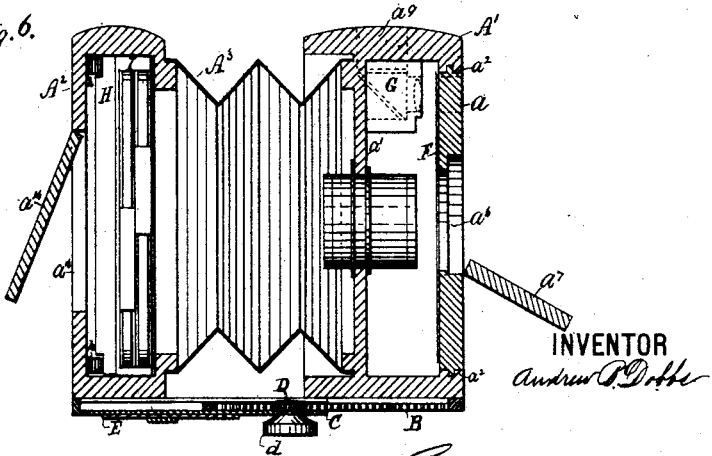
WITNESSES:
INVENTOR
Andrew B. Dobbs
BY Edwin H. Brown HIS ATTY

UNITED STATES PATENT OFFICE.

ANDREW B. DOBBS, OF NEW HAVEN, CONNECTICUT, ASSIGNOR TO THE SCOVILL & ADAMS COMPANY, OF NEW YORK, N. Y.

CAMERA.

SPECIFICATION forming part of Letters Patent No. 470,783, dated March 15, 1892.

Application filed April 7, 1891. Serial No. 387,979. (No model.)

*To all whom it may concern:*

Be it known that I, ANDREW B. DOBBS, of New Haven, in the county of New Haven and State of Connecticut, have invented a certain new and useful Improvement in Cameras, of which the following is a specification.

The object of my improvement is to produce a compact, simple, and efficient camera which will not have the appearance of a camera when in the condition to which it is adjusted for transportation.

I will describe a camera embodying my improvement, and then point out the novel features in the claims.

In the accompanying drawings, Figure 1 is a perspective view of a camera embodying my improvement and in condition for being transported or carried. Fig. 2 is a side view of a camera embodying my improvement. Fig. 3 is a view of the opposite side of said camera. Fig. 4 is a bottom view thereof. Fig. 5 is a front view of the camera. Fig. 6 is a horizontal section looking upward. In Figs. 2, 3, 4, and 6 the camera is shown as adjusted for use and not for transportation. Fig. 5 is of such a character as not to indicate whether the camera is in condition for use or transportation.

Similar letters of reference designate corresponding parts in all the figures.

The body of the camera consists, essentially, of a number of frames made to resemble books having an expansible connection intermediate of them. As here shown, there are but two book-like frames $A'$ $A^2$, and the intermediate expansible connection consists of a bellows-like bag or chamber $A^3$. Normally the book-like frames will be adjusted so as to be in close contact, and while they are so adjusted the camera will have the appearance of two similarly-bound books placed side by side. The book-like frames may be adjusted toward and away from each other by any suitable devices. In the present instance I have shown a rack and pinion as employed for this purpose. The adjusting devices may be made so that in appearance they will resemble a clasp such as is often used in connection with albums and like books. The rack B is attached to one of the book-like frames by screws $b$ or otherwise, and the other of said book-like frames has attached to it by screws $c$ or otherwise a hollow frame C, that receives the rack B and has mounted in it a short shaft, which at one end is provided with a pinion D, engaging with the rack, and at the other end with a hand-piece $d$. Obviously by turning the hand-piece the two book-like frames may be adjusted away from or toward each other. Any suitable catch may be used to fasten the plate C and rack B in any relative position after adjustment. A spring-detent E, fitted to a hole in the plate C and adapted to engage with one of a number of holes in the rack B, may be used for this purpose. The book-like frame $A'$ has a back $a'$ and a removable front $a$. It as a whole constitutes a chamber wherein the lens-tube is accommodated. The lens-tube is fitted in the back $a'$. The removable front $a$ is fitted to slide in the sides of an opening $a^2$, formed in the book-like frame $A'$, and at the bottom has an inwardly-extended flange or lip $a^3$, which fits into a notch in the bottom of the main portion of said book-like frame $A'$. This removable cover has fastened to its back shutter mechanism F of any suitable pattern, and through its flange or lip extends a hand-piece $f$ for setting the shutter and the handle of a detent $f^2$, whereby said shutter mechanism may be released. The removable front $a$ of the book-like frame $A'$ may be fastened in place in any suitable manner—as, for instance, by means of a button $a^4$, pivoted to the main portion of the book-like frame $A'$ and adapted to overlap the flange or lip of the removable cover $a$ thereof. A slide $a^5$ extends through the removable cover $a$ of the book-like frame $A'$ for the purpose of adjusting the tension of a spring whereby the shutter is moved. The removable cover $a$ of the book-like frame $A'$ has an opening $a^6$ opposite the lens-tube, and with this opening is combined a hinged cover $a^7$.

In the chamber formed of the book-like frame $A'$ a finder G, consisting of a suitable camera-obscura, is located. It may be fastened to the back of the book-like frame. The removable cover $a$ of this frame will have an opening $a^8$ opposite the finder, and in one of the sides of the book-like frame opposite the finder there will be an opening $a^9$, provided with a hinged cover $a^{10}$.

The book-like frame $A^2$ serves to hold a focusing-glass H, which is pressed forwardly by springs $h$, but may be forced backwardly, so that said frame may receive a plate-holder I or a roller-holder. At the bottom this book-like frame $A^2$ has a hinged section $a^{11}$, which, as here shown, is hinged to the rear side or back of said frame and fastened when in position by means of a hook $a^{12}$, pivotally connected to the main part of the frame and adapted to engage with a pin on the hinged section. By swinging back the hinged section access may be had to the inside of the frame. The rear of the book-like frame $A^2$ has an opening $a^{13}$, through which the focusing-glass will be visible, and with this opening is combined a hinged cover $a^{14}$.

I am unwilling to be restricted to the number of books which the aforesaid frames may represent, and I am also unwilling to be restricted to representing books similarly bound in constructing such frame.

What I claim as my invention, and desire to secure by Letters Patent, is—

1. The combination, in a camera-body, of a book-like frame having the back $a'$ and the removable front $a$, a book-like frame having the hinged section $a^{11}$ and the opening $a^{13}$, the bellows-like connection between the frames, and an adjusting device extending from one book-like frame to the other in the position of a book-clasp, substantially as specified.

2. The combination, in a camera-body, of book-like frames, a bellows-like connection between them, and an adjusting device consisting of two parts having a sliding connection one with the other, so as to hold the book-like frames in proper alignment, and said parts of the adjusting device being located at the side intermediate of the top and bottom of the camera in the position of a book-clasp, substantially as specified.

In testimony whereof I have signed my name to this specification in the presence of two subscribing witnesses.

ANDREW B. DOBBS.

Witnesses:
JULIUS TWISS,
CHRISTINE CRAMER.